(12) United States Patent
Tomita

(10) Patent No.: US 6,931,577 B2
(45) Date of Patent: Aug. 16, 2005

(54) BIT ERROR MEASUREMENT APPARATUS AND METHOD, AND RECORDING MEDIUM

(75) Inventor: Masayuki Tomita, Saitama (JP)

(73) Assignee: Advantest Corporation, Tokyo (JP)

( * ) Notice: Subject to any disclaimer, the term of this patent is extended or adjusted under 35 U.S.C. 154(b) by 472 days.

(21) Appl. No.: 09/901,150

(22) Filed: Jul. 10, 2001

(65) Prior Publication Data

US 2002/0023243 A1 Feb. 21, 2002

(30) Foreign Application Priority Data

Jul. 13, 2000 (JP) .................................. P2000-212308

(51) Int. Cl.$^7$ ................................................ H04L 1/24
(52) U.S. Cl. ..................................................... 714/704
(58) Field of Search ........................................ 714/704

(56) References Cited

U.S. PATENT DOCUMENTS

| 5,359,600 | A | | 10/1994 | Ueda et al. ................ 370/60.1 |
|---|---|---|---|---|
| 5,726,991 | A | | 3/1998 | Chen ........................ 371/5.1 |
| 5,870,428 | A | * | 2/1999 | Miller et al. ................ 375/221 |
| 5,878,041 | A | * | 3/1999 | Yamanaka et al. ..... 370/395.65 |
| 5,943,604 | A | * | 8/1999 | Chen et al. ................ 455/3.06 |
| 5,982,752 | A | | 11/1999 | Katuszonek ................ 370/242 |
| 6,034,948 | A | * | 3/2000 | Nakamura et al. .......... 370/246 |
| 6,091,712 | A | * | 7/2000 | Pope et al. .................. 370/244 |
| 6,542,538 | B2 | * | 4/2003 | Fischel et al. .............. 375/224 |

FOREIGN PATENT DOCUMENTS

| EP | 0730359 A2 | 4/1992 |
|---|---|---|
| EP | 0637150 | 2/1995 |
| EP | 0849908 A2 | 12/1997 |
| EP | 0961437 A1 | 5/1998 |
| EP | 0961437 | 1/1999 |
| WO | WO 96/17454 | 11/1995 |
| WO | 96/17454 | 6/1996 |
| WO | WO 97/37453 | 3/1997 |

* cited by examiner

*Primary Examiner*—Stephen M. Baker
(74) *Attorney, Agent, or Firm*—Lowe Hauptman Gilman & Berner, LLP

(57) ABSTRACT

It is an object to provide an apparatus in which measurement of a bit error rate of a transmission network that is used for digital broadcasting is capable of being executed during the time that actual broadcasting of the digital broadcasting is performed, namely the measurement is executed during the time that the transmission network is used.

A bit error measurement apparatus is provided with a NULL packet extraction circuit 42 for extracting a NULL packet whose whole data of a payload should be 0 from packets transmitted through transmission net work 30, a data comparison section 44 for comparing the data of the payload of the NULL packet to comparison data 0 that should be a value of the data of the payload of the NULL packet, and an error counter 46 for counting error while judging the data as error when result of comparison is disagreement. The bit error measurement apparatus is capable of measuring the bit error while extracting the NULL packet during the time that the packet is transmitted through the transmission network 30, therefore, it is possible to measure the bit error during the time that the transmission network is used.

3 Claims, 5 Drawing Sheets

BIT ERROR MEASUREMENT APPARATUS AND METHOD, AND RECORDING MEDIUM

BACKGROUND OF INVENTION

1. Field of Invention

The present invention relates to measurement of a bit error rate in a digital broadcasting.

2. Description of the Related Art

FIG. 5 illustrates a system configuration when measurement of the bit error rate is carried out in the digital broadcasting.

In order to carry out measurement of the bit error rate, it is necessary that a transmission side transmission analyzer 100 generates PRBS (Pseudo-Random Binary Sequence: pseudo random pattern) signal. The PRBS signal is modulated by a modulator 102, before being transmitted to a transmission network 300. The PRBS signal passed through the transmission network 300 is digital-demodulated by a digital demodulator 202 to return to original PRBS signal. However, since a bit error occurs, the digital demodulated PRBS signals does not exactly return to the original PRBS signals generated by the transmission side transmission analyzer 100. The PRBS signal output by the demodulator 202 is input to a reception side transmission analyzer 204. The reception side transmission analyzer 204 measures the bit error rate by comparing the PRBS signal output by the demodulator 202 to the PRBS signal generated by the transmission side transmission analyzer 100 in every bit.

SUMMARY OF INVENTION

However, in order to measure the bit error rate, the PRBS signal must be passed through the transmission network 300. Accordingly, actual broadcasting of the digital broadcasting must be interrupted during the time that the PRBS signal is passed through the transmission network 300.

The present invention has been made in consideration of the abovementioned circumstances, and an object of the present invention is to provide apparatus and so forth which is capable of executing measurement of the bit error rate in the transmission network used for the digital broadcasting during the time that the transmission network is used.

According to the present invention, a bit error measurement apparatus for measuring a bit error of a transmission network through which transmission of a packet having digital data to be transmitted is executed, includes: a packet extraction unit for extracting an equivalence packet whose all of the digital data should have the same values from among the packets transmitted through the transmission network; a data comparison unit for comparing the digital data of the equivalence packet to comparison data that should have the value of the digital data of the equivalence packet; and an error judgment unit for judging the data as an error when result of the comparison is disagreement.

According to a bit error measurement apparatus constituted as described-above, the packet contains NULL packet whose all of digital data to be transmitted is 0 (zero) in favor of adjustment of rate and so forth. The whole digital data of the NULL packet should have 0 when transmitted through the transmission network, however, actually, since the bit error occurs, bits of 1 not 0 appear caused by the bit error.

Accordingly, it is possible to judge whether the bit error occurs in such a way that comparison is made between comparison data (if NULL packet; "0") and an equivalence packet while extracting the equivalence packet whose all of the digital data should have the same value, such as the NULL packet and so forth.

Moreover, since it is possible to extract the equivalence packet while allowing the packet to be transmitted through the transmission network, the bit error can be measured during the time that the transmission network is used.

The present invention is a bit error measurement apparatus wherein the comparison data is either 0 or 1.

According to the present invention described in claim 3, a bit error measurement method for measuring a bit error of a transmission network through which transmission of a packet having digital data to be transmitted is executed, includes: a packet extraction step for extracting an equivalence packet whose all of the digital data should have the same values from among the packets transmitted through the transmission network; a data comparison step for comparing the digital data of the equivalence packet to comparison data that should have the value of the digital data of the equivalence packet; and an error judgment step for judging the data as an error when result of the comparison is disagreement.

The present invention is a computer-readable medium having a program of instructions for execution by the computer to perform a bit error measurement process for measuring a bit error of a transmission network through which transmission of a packet having digital data to be transmitted is executed, including: a packet extraction processing for extracting an equivalence packet whose all of the digital data should have the same values from among the packets transmitted through the transmission network; a data comparison processing for comparing the digital data of the equivalence packet to comparison data that should have the value of the digital data of the equivalence packet; and an error judgment processing for judging the data as an error when result of the comparison is disagreement.

According to the present invention a bit error measurement apparatus for measuring a bit error of a transmission network through which transmission of a packet with digital data to be transmitted is executed, includes: a packet extraction unit for extracting a packet for measurement to measure a bit error from among the packets transmitted through the transmission network; a data comparison unit for comparing the digital data of the packet for measurement to comparison data that should have the value of the digital data of the packet for measurement; and an error judgment unit for judging the data as an error when result of the comparison is disagreement.

The present invention is a bit error measurement apparatus wherein the comparison data is a pseudo-random signal.

According to the present invention a bit error measurement method for measuring a bit error of a transmission network through which transmission of a packet with digital data to be transmitted is executed, includes: a packet extraction step for extracting a packet for measurement to measure a bit error from among the packets transmitted through the transmission network; a data comparison step for comparing the digital data of the packet for measurement to comparison data that should have the value of the digital data of the packet for measurement; and an error judgment step for judging the data as an error when result of the comparison is disagreement.

The present invention is a computer-readable medium having a program of instructions for execution by the computer to perform a bit error measurement process for measuring a bit error of a transmission network through which transmission of a packet having digital data to be transmitted is executed, including: a packet extraction processing for extracting a packet for measurement to measure a bit error from among the packets transmitted through the transmission network; a data comparison processing for comparing the digital data of the packet for measurement to comparison data that should have the value of the digital data of the packet for measurement; and an error judgment processing for judging the data as an error when result of the comparison is disagreement.

DESCRIPTION OF THE PREFERRED EMBODIMENT

The embodiments of the present invention will be described in detail below using accompanying drawings.

Figure 1:
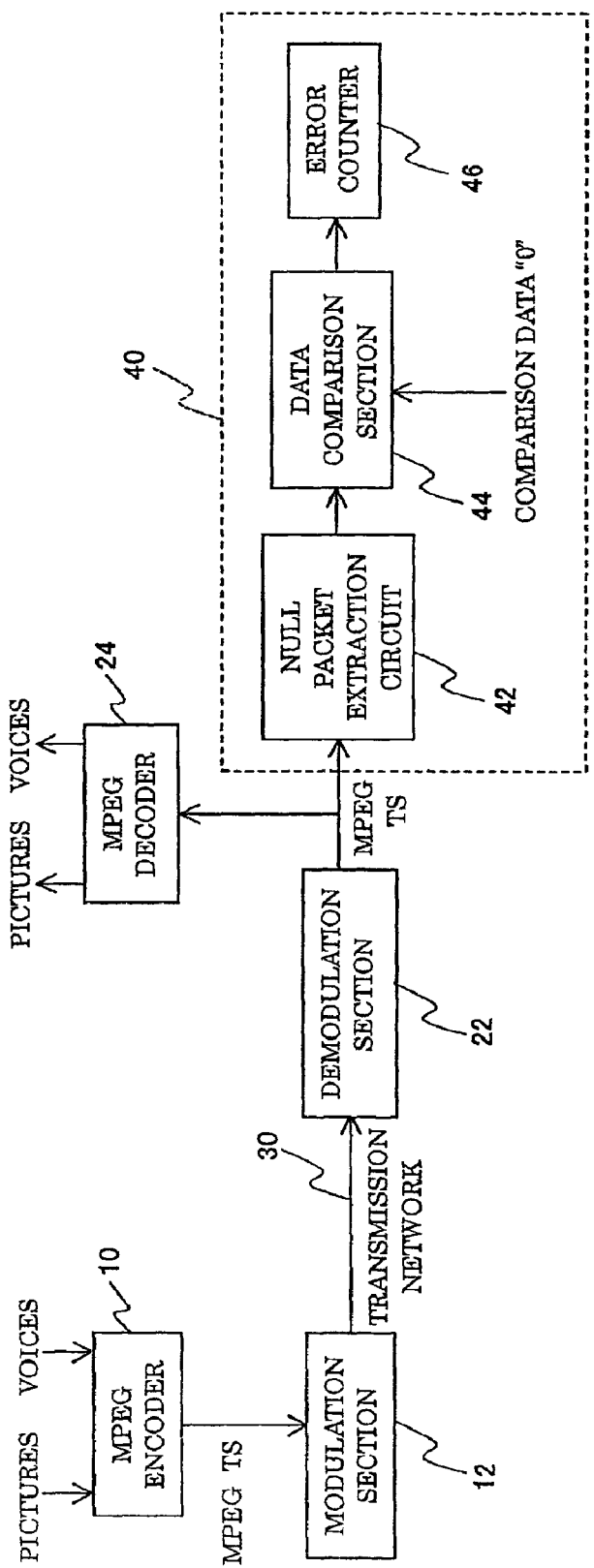
FIG. 1 is a block diagram illustrating configuration of the bit error measurement apparatus 40 according to the embodiment of the present invention.

FIG. 1 is a block diagram illustrating a configuration of a bit error measurement apparatus 40 according to the embodiment of the present invention. The bit error measurement apparatus 40 according to the embodiment of the present invention is provided with a NULL packet extraction circuit 42, a data comparison section 44, and an error counter 46. Furthermore, the bit error measurement apparatus 40 is connected to a digital broadcasting system for transmitting MPEG TS (Transport Stream) by use of a transmission network 30.

The digital broadcasting system is provided with a MPEG encoder 10, a modulation section 12, a transmission network 30, a demodulation section 22, and a MPEG decoder 24.

Figure 2:
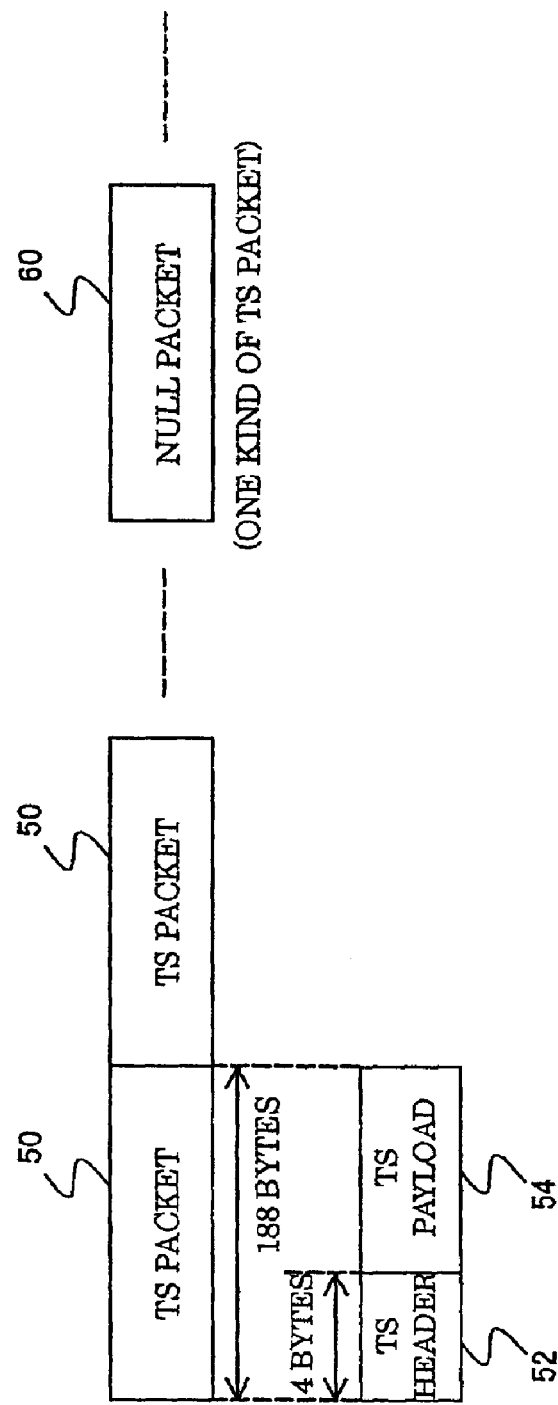
FIG. 2 is a view illustrating contents of MPEG TS.

The MPEG encoder 10 MPEG-encodes pictures and voices to output MPEG TS. FIG. 2 illustrates contents of the MPEG TS. As illustrated in FIG. 2, the MPEG TS is data in which TS packets 50 are ranged. The TS packet 50 has 188 bytes, in which front 4 bytes correspond a TS header 52, and remaining 184 bytes correspond to a TS payload 54. The TS header 52 is data which indicates an attribute and so forth of the TS packet 50. The TS header 52 records packet ID of the TS packet 50. The TS payload 54 is digital data to be transmitted.

Figure 3:
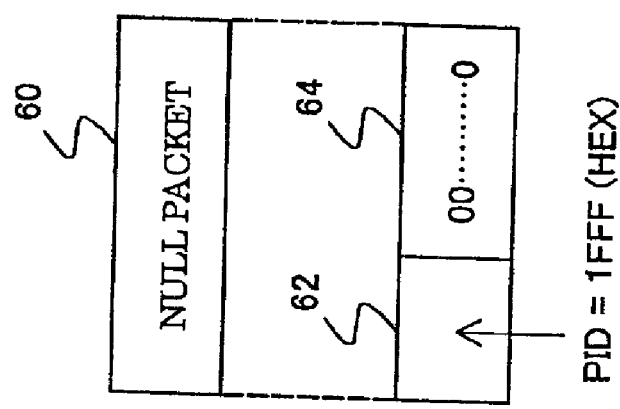
FIG. 3 is a view illustrating detail of the NULL packet 60.

The MPEG TS includes the NULL packet 60 to be one kind of the TS packet 50 for the sake of adjustment of the transmission rate and so forth. FIG. 3 illustrates details of the NULL packet 60. Also the NULL packet 60 has the header 62, and the payload 64. The packet ID of the NULL packet 60 is determined to 1FFF (HEX), and this packet ID is recorded in header 62. The whole data of the payload 64 is 0. Thus, in the MPEG TS, the payload records the digital data to be transmitted, and a packet in which all of digital data within a payload has the same value (example, 0, 1) exists. If such packet is called as equivalence packet, also the NULL packet 60 is one kind of the equivalence packet. As for the equivalence packet, also, it can be considered that the whole value of the payload should be "1" as the equivalence packet.

Returning to FIG. 1, the modulation section 12 digital-modulates the MPEG TS output from the MPEG encoder 10 to transmit to the transmission network 30. The transmission network 30 means the whole of digital communication medium such as satellite communication, terrestrial communication, CATV (Cable TV) and so forth. The demodulation section 22 digital-demodulates data transmitted through the transmission network 30 to restore to the MPEG TS. The MPEG decoder 24 MPEG-decodes restored MPEG TS to restore pictures, voices that are pictures, voices before MPEG-encoded.

The bit error measurement apparatus 40 connected to the demodulation section 22 receives input of the MPEG TS. The NULL packet extraction circuit 42 extracts the NULL packet 60 from the MPEG TS. The packet ID of the NULL packet 60 is determined to 1FFF(HEX), and the packet ID is recorded in the header 62. Accordingly, the NULL packet extraction circuit 42 reads out the packet ID from the header, and if the packet ID is 1FFF(HEX), the NULL packet extraction circuit 42 regards as the NULL packet 60 to extract it. Moreover, to extract the packet by reading out the packet ID from the header is capable of being used for extraction of the equivalence packet.

Furthermore, in the present embodiment, the NULL packet is extracted for measuring the bit error, however, also, it is possible to measure the bit error by extracting the equivalence packet.

The data comparison section 44 compares data of the payload 64 of the NULL packet 60 to comparison data "0" that should have the value of the payload 64 of the NULL packet 60 in every 1 bit. The whole data of the payload 64 should have "0", however, also, there is the case that the data of the payload 64 becomes "1" not "0" caused by the bit error. Accordingly, it is possible to detect the error by comparing the bit in every 1 bit.

Moreover, when the bit error is measured by extracting the equivalence packet, there may be the case that the data of the payload should be "1". In such a case, comparison is made between the value of the payload and "1" in every 1 bit.

The error counter 46 counts the number of times of occurrence of the error while judging the data as the error when comparison in every 1 bit at the data comparison section 44 is disagreement. Namely, the error counter 46 counts the number of times that is one in which the data of the payload 64 of the NULL packet 60 is "1".

Figure 4:
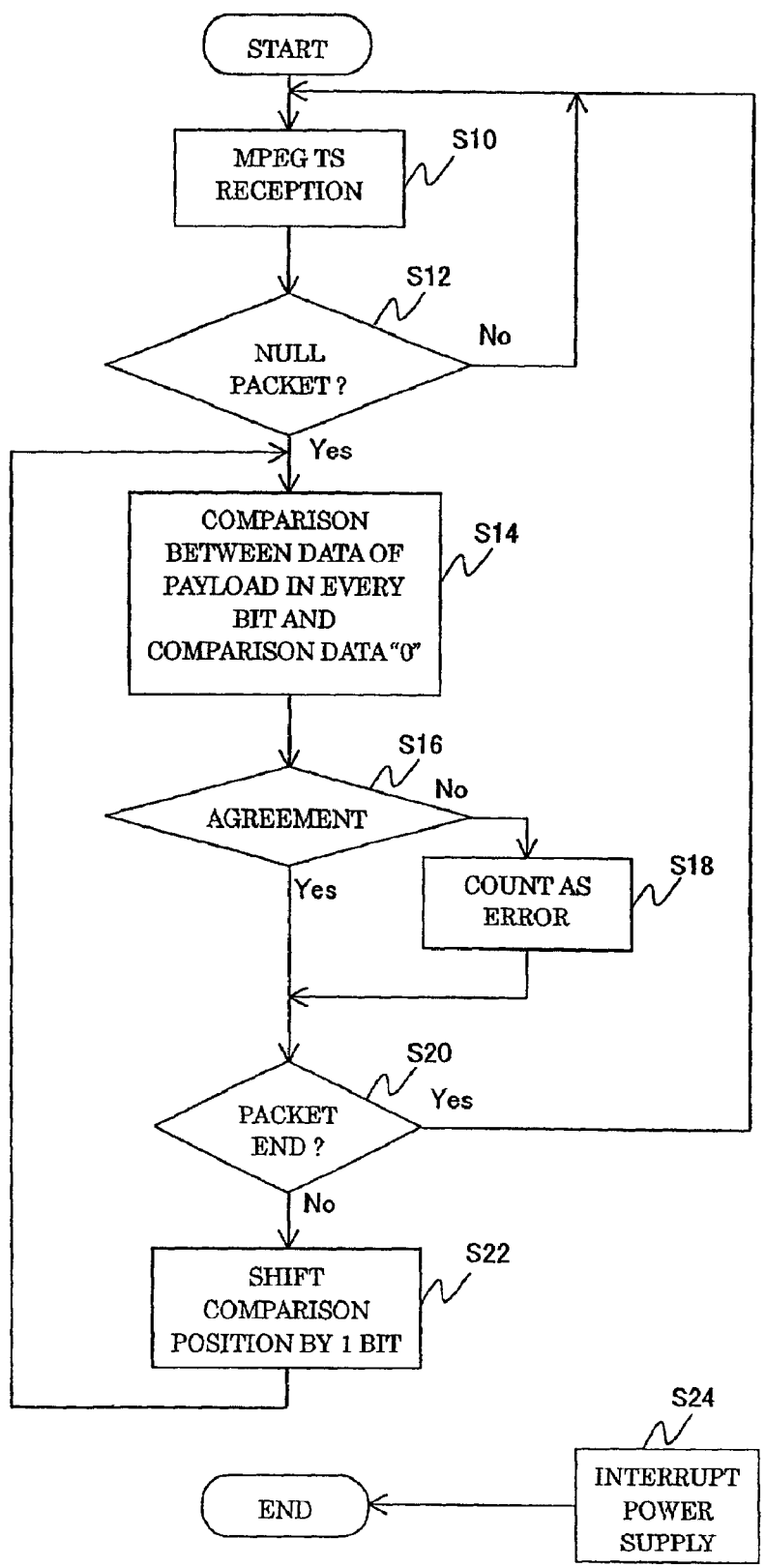
FIG. 4 is a flowchart illustrating operations of the bit error measurement apparatus 40 according to the embodiment of the present invention.
Figure 5:
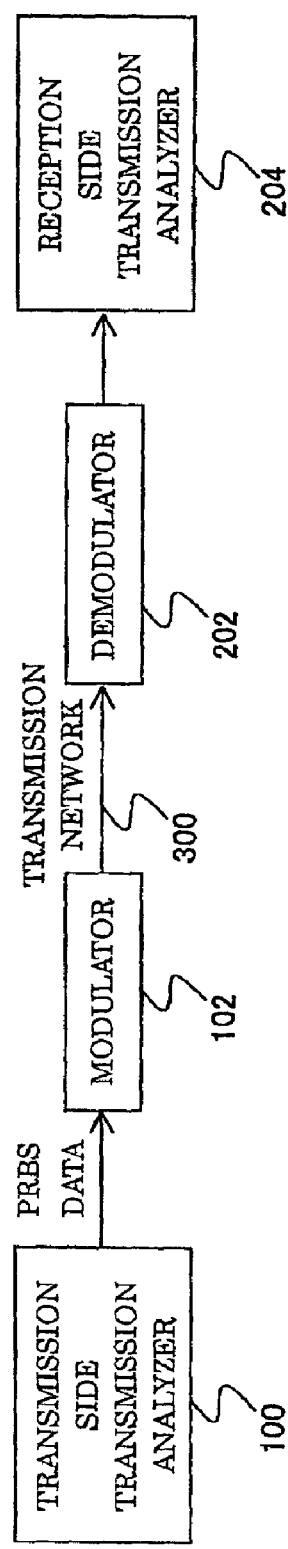
FIG. 5 is a view illustrating system configuration when performing measurement of the bit error rate in the conventional digital broadcasting.

Next, operations of the bit error measurement apparatus 40 according to the embodiment of the present invention will be described referring to flowchart of FIG. 4. Firstly, pictures and voices are MPEG-encoded by the MPEG encoder 10 to become MPEG TS. The MPEG TS is digital-modulated by the modulation section 12, then digital-modulated MPEG TS is transmitted to the transmission network 30. The data transmitted through the transmission network 30 is digital-demodulated by the demodulation section 22, then being restored to the MPEG TS. The restored MPEG TS is further restored to pictures and voices by the MPEG decoder 24.

The MPEG TS which is restored is transmitted to the MPEG decoder 24, in parallel therewith, also, the MPEG TS which is restored is transmitted to the NULL packet extraction circuit 42, then, the NULL packet extraction circuit 42 receives the MPEG TS (S10).

The NULL packet extraction circuit 42 reads out the packet ID from the TS header 52 of the MPEG TS, then, the NULL packet extraction circuit 42 judges whether the TS packet 50 is the NULL packet 60 depending on whether the packet ID is 1FFF(HEX) (S12). If the TS packet 50 is not the NULL packet 60 (S12, No), the process returns to reception of the MPEG TS (S10). If the TS packet 50 is the NULL packet 60 (S12, Yes), the NULL packet extraction circuit 42 extracts the NULL packet 60, and the data comparison section 44 compares the data of the payload 64 in every bit to the comparison data "0" (S14). As a result of the comparison, if the data of the payload 64 does not agree with the comparison data "0" (S16, No), since it means the bit error, the error counter counts as the error (S18). Then, the data comparison section 44 judges whether the comparison is completed to an end of the NULL packet 60 (S20). Moreover, as a result of the comparison between the data of the payload 64 in every bit and the comparison data "0", if the data of the payload 64 agrees with the comparison data "0" (S16, Yes), since it means normal, the data comparison section 44 then judges whether the comparison is completed to an end of the NULL packet 60 without counting as the error (S20).

If the comparison is not completed to the end of the NULL packet 60 (S20, No), comparison position in the NULL packet 60 is made to move by 1 bit (S22), the process returns to comparison in every 1 bit (S14). If the comparison is completed to the end of the NULL packet 60 (S20, Yes), returning to reception of the MPEG TS (S10).

Moreover, the aforementioned step ends in such a way as to interrupt power supply of the bit error measurement apparatus (S24) in arbitrary step.

According to the embodiment of the present invention, the MPEG TS which is restored is transmitted to the MPEG decoder 24 from the demodulation section 22, in parallel therewith, also, the MPEG TS which is restored is transmitted to the NULL packet extraction circuit 42. If the NULL packet extraction circuit 42 receives the MPEG TS, it is possible to measure the bit error.

Accordingly, the user enjoys pictures, music that are decoded by the MPEG decoder 24, at the same time, it is possible to measure the bit error depending on the bit error measurement apparatus 40. Namely, the bit error is capable of being measured during the time that the digital broadcasting is actually put on the air.

Furthermore, in the above-described embodiment, the equivalence packet is used as the packet for measurement to measure the bit error. However, it is also preferable that a packet whose payload stores therein data of Pseudo-Random (PRBS) signal may be made to use as the packet for measurement to measure the bit error instead of the equivalence packet.

Furthermore, the aforementioned embodiment is also capable of being realized in such a way as described later. A computer with a medium read apparatus is necessary for realization thereof, in which the medium read apparatus is provided with CPU, hard disk, medium (floppy disk, CD-ROM and so forth), and the medium records program for realizing respective sections described above, then the medium read apparatus of the computer allows the medium with program to be read to install to the hard disk. Also such method is capable of realizing function described-above.

According to the present invention, it is possible to judge whether the bit error occurs in such a way that the comparison is made between the equivalence packet and the comparison data (if NULL packet; "0") while extracting the equivalence packet whose all of digital data should have the same value, such as NULL packet and so forth.

Further, since it is possible to extract the equivalence packet while transmitting the packet through the transmission network, it is possible to measure the bit error during the time that the transmission network is used.

What is claimed is:

1. A bit error measurement apparatus for measuring a bit error of a transmission network through which transmission of a packet having digital data to be transmitted for digital broadcasting is executed, comprising:

a packet extraction means for extracting a NULL packet whose all of said digital data should have the same value 0 from among said packets transmitted through said transmission network;

a data comparison means for comparing said digital data of said NULL packet to comparison data that should have the value 0 of said digital data of said NULL packet; and an error judgment means for judging the data as an error when result of said comparison is disagreement, wherein the packet includes the NULL packet for adjusting a transmission rate of the digital broadcasting.

2. A bit error measurement method for measuring a bit error of a transmission network through which transmission of a packet having digital data to be transmitted for a digital broadcasting is executed, comprising:

a packet extraction step for extracting a NULL packet whose all of said digital data should have the same values 0 from among said packets transmitted through said transmission network;

a data comparison step for comparing said digital data of said NULL packet to comparison data that should have the value 0 of said digital data of said NULL packet; and an error judgment step for judging the data as an error when result of said comparison is disagreement, wherein the packet includes the NULL packet for adjusting a transmission rate of the digital broadcasting.

3. A computer-readable medium having a program of instructions for execution by the computer to perform a bit error measurement process for measuring a bit error of a transmission network through which transmission of a packet having digital data to be transmitted for a digital broadcasting is executed, comprising:

a packet extraction processing for extracting a NULL packet whose all of said digital data should have the same value 0 from among said packets transmitted through said transmission network;

a data comparison processing for comparing said digital data of said NULL packet to comparison data that should have the value 0 of said digital data of said NULL packet; and an error judgment processing for judging the data as an error when result of said comparison is disagreement, wherein the packet includes the NULL packet for adjusting a transmission rate of the digital broadcasting.

* * * * *